United States Patent
Kanda

(10) Patent No.: US 8,558,898 B2
(45) Date of Patent: Oct. 15, 2013

(54) IMAGE BLUR CORRECTION APPARATUS MOUNTED ON OPTICAL EQUIPMENT, AND IMAGE PICKUP APPARATUS

(75) Inventor: Akihiko Kanda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 165 days.

(21) Appl. No.: 13/184,098

(22) Filed: Jul. 15, 2011

(65) Prior Publication Data

US 2012/0013753 A1 Jan. 19, 2012

(30) Foreign Application Priority Data

Jul. 15, 2010 (JP) .................................. 2010-160631

(51) Int. Cl.
*H04N 5/228* (2006.01)
*G03B 17/00* (2006.01)
*G02B 27/64* (2006.01)

(52) U.S. Cl.
USPC .......................... 348/208.11; 396/55; 359/557

(58) Field of Classification Search
USPC .......................... 348/208.11; 395/55; 359/557
See application file for complete search history.

(56) References Cited

U.S. PATENT DOCUMENTS

| | | | |
|---|---|---|---|
| 7,804,645 B2 * | 9/2010 | Morita et al. ................. | 359/554 |
| 2007/0146883 A1 * | 6/2007 | Akada et al. .................. | 359/554 |
| 2009/0002500 A1 * | 1/2009 | Kawai et al. ............. | 348/208.11 |
| 2009/0185796 A1 * | 7/2009 | Tsutsumi et al. ............... | 396/55 |
| 2009/0232483 A1 * | 9/2009 | Anshita ........................... | 396/55 |
| 2010/0309324 A1 * | 12/2010 | Shirono .................... | 348/208.11 |
| 2011/0013030 A1 * | 1/2011 | Lee ........................... | 348/208.11 |
| 2011/0097062 A1 * | 4/2011 | Tsuruta et al. .................. | 396/55 |
| 2011/0102613 A1 * | 5/2011 | Noguchi .................. | 348/208.11 |
| 2011/0234827 A1 * | 9/2011 | Inoue et al. ............. | 348/208.11 |

FOREIGN PATENT DOCUMENTS

JP 10-26783 A 1/1998

* cited by examiner

*Primary Examiner* — Tuan Ho
*Assistant Examiner* — Shahbaz Nazrul
(74) *Attorney, Agent, or Firm* — Rossi, Kimms & McDowell LLP

(57) ABSTRACT

An image pickup apparatus which decreases the number of components to reduce man-hours for assembly. A base plate, which supports a lens holder in such a manner that the lens holder is movable in a direction perpendicular to an optical axis, has an engagement portion having an opening disposed in one direction around the optical axis. Movement of the lens holder in the direction of the optical axis is inhibited by engagement between part of the lens holder and the engagement portion. A rotation inhibition plate, which is provided on a subject side of the lens holder, is movable in a first direction perpendicular to the optical axis integrally with the lens holder and is inhibited from moving in a second direction perpendicular to both the optical axis and the first direction.

20 Claims, 10 Drawing Sheets

IMAGE BLUR CORRECTION APPARATUS MOUNTED ON OPTICAL EQUIPMENT, AND IMAGE PICKUP APPARATUS

BACKGROUND OF THE INVENTION

1. Field of the Invention

The present invention relates to an image blur correction apparatus mounted on optical equipment including an image pickup apparatus such as a camera, and an image pickup apparatus having the image blur correction apparatus.

2. Description of the Related Art

Optical equipment such as cameras detects acceleration, angular acceleration, angular velocity, angular displacement, and so on of vibrations applied to the optical equipment, and drives a correction lens for making an imaging optical axis eccentric based on image blur information obtained by performing arithmetic processing on the detection results as appropriate, thus correcting for an image blur. FIG. 14 shows an example where an image blur correction apparatus 50 is provided on a lens barrel 52 of a digital camera 51. As this type of conventional image blur correction apparatus, there has been disclosed an image blur correction apparatus which has a correction unit with a holder supporting a lens or an image pickup device, and a rotation inhibition plate that is provided on a surface of a base plate which is opposite to a surface supporting the holder, for inhibiting rotation of the holder in a direction about an optical axis (Japanese Laid-Open Patent Publication (Kokai) No. H10-26783).

However, according to Japanese Laid-Open Patent Publication (Kokai) No. H10-26783, to inhibit movement of the holder in the direction of the optical axis, it is necessary to screw separate rollers to arms, which extend outwardly from the holder in a radial direction, after the holder is mounted on the base plate, and this increases the number of components, resulting in an increase in man-hours for assembly.

SUMMARY OF THE INVENTION

The present invention provides an image blur correction apparatus capable of decreasing the number of components to reduce man-hours for assembly, and an image pickup apparatus having the image blur correction apparatus.

Accordingly, a first aspect of the present invention provides an image blur correction apparatus comprising a lens holder configured to hold a lens, a drive unit configured to move said lens holder, a base member configured to support said lens holder movably in a direction perpendicular to an optical axis, wherein said lens holder is disposed on a subject side of said base member, and wherein said base member comprises an engagement portion having an opening disposed in one direction around the optical axis, and part of said lens holder is engaged with the engagement portion to inhibit movement of said lens holder in the direction of the optical axis, and a rotation inhibition member configured to inhibit movement of said lens holder in a direction around the optical axis, wherein said rotation inhabitation member is disposed on an opposed side of said base member across said lens holder and be engaged with said lens holder and said base member, and wherein said rotation inhibition member is movable in a first direction perpendicular to the optical axis integrally with said lens holder and is inhibited from moving in a second direction perpendicular to both the optical axis and the first direction.

Accordingly, a second aspect of the present invention provides an image pickup apparatus having an image blur correction apparatus as described above.

Accordingly, a third aspect of the present invention provides an image blur correction apparatus comprising a lens holder configured to hold a lens, a drive unit configured to move said lens holder, a base member configured to support said lens holder movably in a direction perpendicular to an optical axis, wherein said base member comprises an engagement portion having an opening disposed in one direction around the optical axis, and part of said lens holder is engaged with the engagement portion to inhibit movement of said lens holder in the direction of the optical axis, and a rotation inhibition member configured to inhibit movement of said lens holder in a direction around the optical axis, wherein said rotation inhibition member is movable in the direction of the optical axis and a first direction perpendicular to the optical axis, and inhibits movement of said lens holder in a direction around the optical axis, the direction of the optical axis, and a second direction perpendicular to the direction of the optical axis and the first direction, wherein said lens holder is disposed on a subject side of said base member, and the rotation inhibition is disposed on a subject side of said lens holder.

Accordingly, a fourth aspect of the present invention provides an image pickup apparatus having an image blur correction apparatus as described above.

According to the present invention, the number of components can be decreased, and man-hours needed to assemble the image blur correction apparatus can be reduced.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
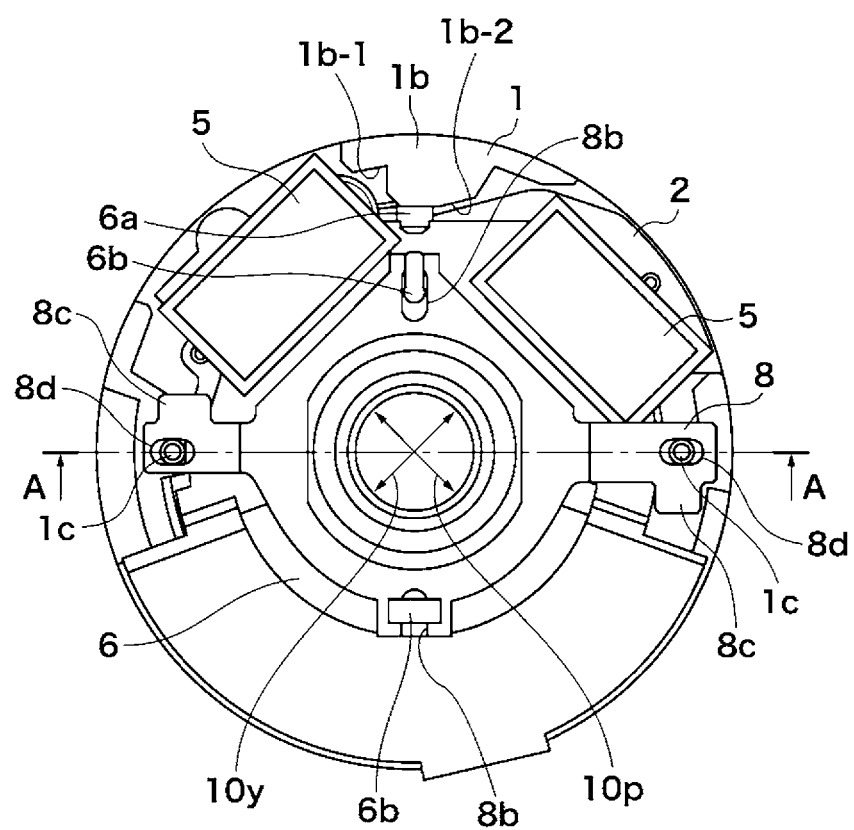
FIG. 1 is a view showing an image blur correction apparatus according to a first embodiment of the present invention as seen from the direction of an optical axis.
Figure 2:
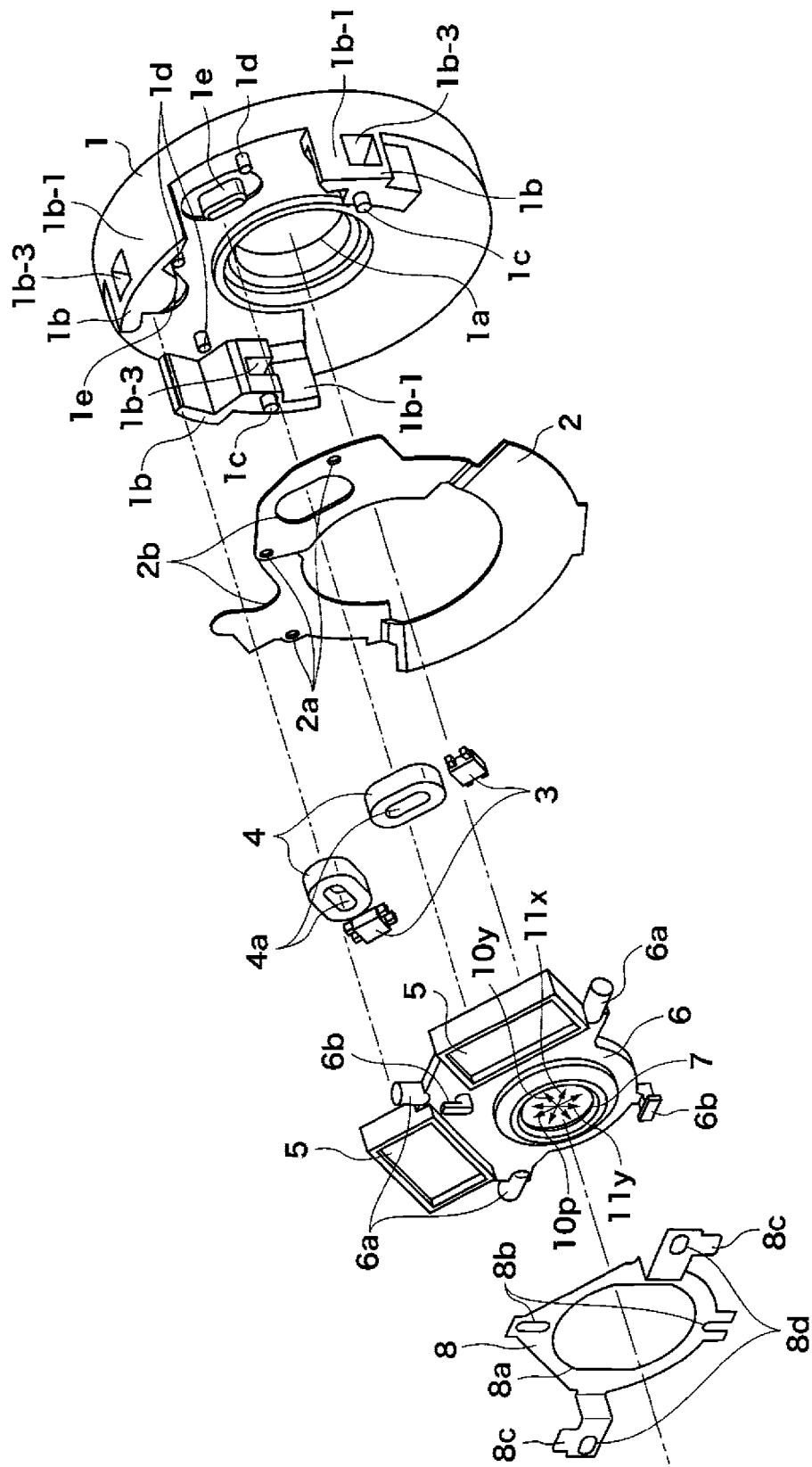
FIG. 2 is an exploded perspective view showing the image blur correction apparatus in FIG. 1.
Figure 3:
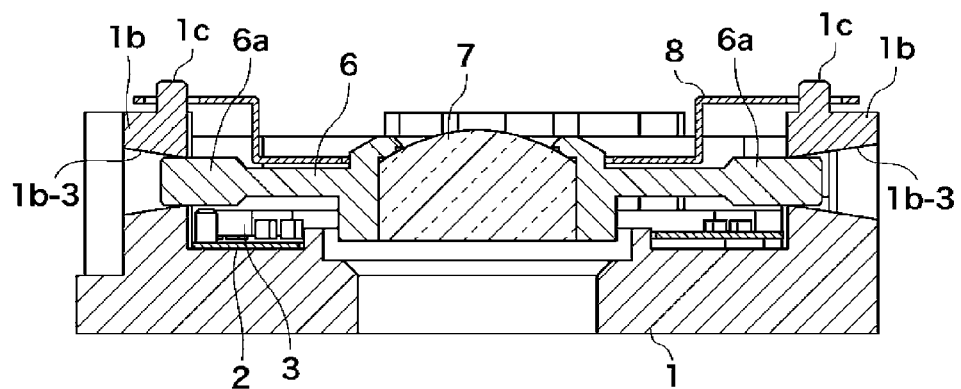
FIG. 3 is a cross-sectional view taken along line A-A in FIG. 1.
Figure 4:
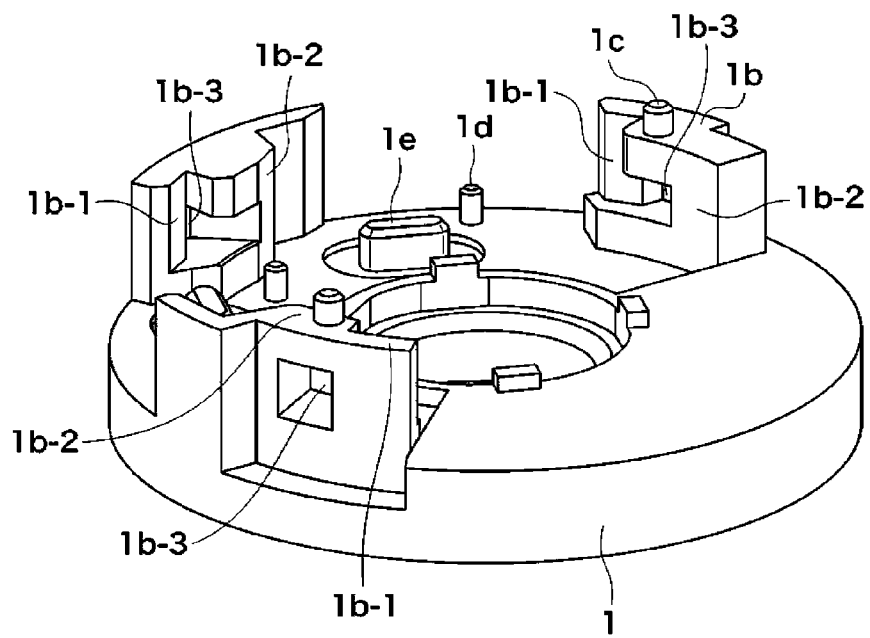
FIG. 4 is a view showing a base plate.

FIG. 1 is a view showing an image blur correction apparatus according to a first embodiment of the present invention as seen from a direction of an optical axis, FIG. 2 is an exploded perspective view showing the image blur correction apparatus in FIG. 1, FIG. 3 is a cross-sectional view taken along line A-A in FIG. 1, and FIG. 4 is a perspective view showing a base plate.

Referring to FIGS. 1 to 3, the image blur correction apparatus according to the present embodiment has a base plate 1, a substrate 2, position detection units 3, coils 4, a holder 6 and a rotation inhibition plate 8.

Referring to FIGS. 1 to 4, the base plate 1 is made of a synthetic resin material or the like and shaped like a short cylinder having an opening 1a in the center, and a plurality of engagement axes 1d, a plurality of engagement portions 1b, and a plurality of positioning axes 1e are provided in a protruding manner on a surface of the base plate 1 which faces a subject in the direction of the optical axis.

The engagement portions 1b are provided at three locations at intervals of about 90 degrees around the optical axis, and each have a beam portion 1b-1 at a longer distance from the center of the optical axis and a beam portion 1b-2 at a shorter distance from the center of the optical axis. Thus, part of each engagement portion 1b has an opening in one direction around the optical axis.

The engagement axis 1c is provided in an protruding manner on each of subject-facing surfaces of two engagement portions 1b disposed 180 degrees away from each other around the optical axis among the three engagement portions 1b. Further, guide holes 1b-3 being in communication with spaces between the beam portions 1b-1 and 1b-2 in a radial direction are formed in outer peripheries of the respective three engagement portions 1b. Here, the base plate 1 corresponds to an exemplary base member of the present invention.

The substrate 2 is a hard substrate or a flexible printed substrate, and has positioning holes 2a which are fitted and positioned on the engagement axes 1d of the base plate 1, and positioning holes 2b which are fitted and positioned on the engagement axes 1e of the base plate 1. In the substrate 2, terminals of the position detection units 3 and the coils 4 are wired in a manner being concentrated on the same plane.

The position detection units 3 are comprised of hall elements, MR elements, or the like, and disposed at locations where permanent magnets 5 provided integrally with the holder 6 overlap the position detection units 3 in the direction of the optical axis, for detecting movement of a plane of the holder 6 which is perpendicular to the optical axis.

The holder 6 is made of a synthetic resin material or the like, and a lens 7 is held in a central part thereof by adhesive joining, thermal caulking, or the like. The permanent magnets 5 are fixed on portions of the holder 6 corresponding to the coils 4 by integral molding or adhesive joining, or the like. The permanent magnets 5 are formed by injection-molding a mixture of Nd—Fe—B rare-earth magnetic powder or ferritic rare-earth magnetic powder and a thermoplastic resin binder material such as polyamide. The permanent magnets 5 are magnetized in the direction of the optical axis, so that magnetic circuits are formed between the permanent magnets 5 and the coils 4 to drive the holder 6.

Moreover, in the folder 6, guide bars 6a extending outwardly in a radial direction are provided at three locations at intervals of about 90 degrees around the optical axis. Further, in the folder 6, two engagement portions 6b each comprised of an axis portion and an overhang portion provided at a distal end of the axis portion are provided at intervals of 180 degrees away from each other around the optical axis. It should be noted that the guide bars 6a may be made of a material with high slidability such as metal and integrated with the holder 6.

The rotation inhibition plate 8 is each formed of a spring material such as phosphor bronze, and shaped like an annular disk having an opening 8a in the center. Engagement holes 8b with which the axis portions of the engagement portions 6b of the holder 6 are to be engaged are formed at two locations about 180 degrees away from each other around the optical axis. The two engagement holes 8b are elongated holes being long in the direction in which the two engagement holes 8b are connected together. Here, the rotation inhibition plate 8 corresponds to an exemplary rotation inhibition member of the present invention.

Figure 5:
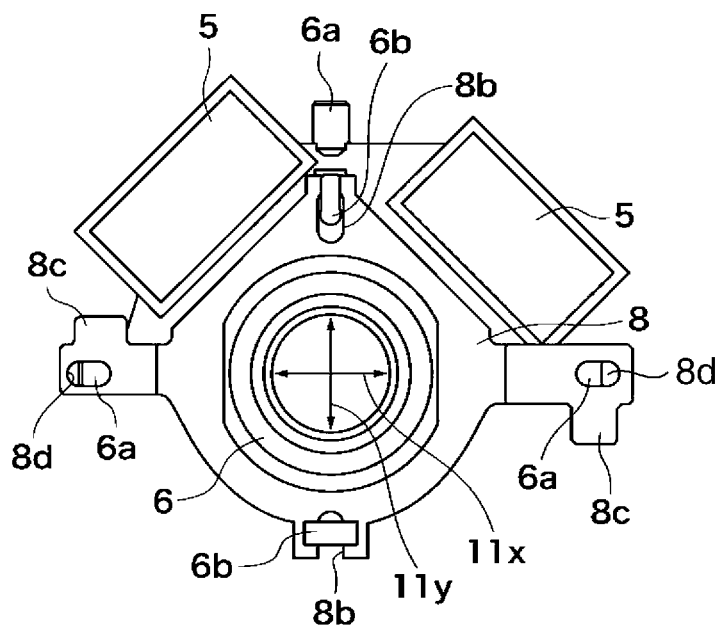
FIG. 5 is a view showing a rotation inhibition plate mounted on a holder.

In a state where the axis portions of the engagement portions 6b of the holder 6 are engaged with the engagement holes 8b as shown in FIG. 5, the holder 6 is movable with respect to the rotation inhibition plate 8 in the direction in which the two engagement holes 8b are connected together, and also, movement of the holder 6 in the direction of the optical axis is inhibited by the overhang portions of the engagement potions 6b abutting onto the rotation inhibition plate 8. Namely, the rotation inhibition plate 8 inhibits rotation of the holder 6 in a direction about an optical axis.

Moreover, in an outer periphery of the rotation inhibition plate 8, flange portions 8c having engagement holes 8d, which are to be engaged with the engagement axes 1c provided in the engagement portions 1b of the base plate 1, are formed at two locations 180 degrees away from each other around the optical axis. A line connecting the two engagement holes 8d is perpendicular to the optical axis, and also perpendicular to the line connecting the two engagement holes 8b. The two engagement holes 8d are elongated holes being long in the direction in which the two engagement holes 8d are connected together.

In a state where the axis portions of the engagement portions 6b of the holder 6 are engaged with the engagement holes 8b of the rotation inhibition plate 8 as shown in FIG. 5, the holder 6 is inhibited from moving with respect to the rotation inhibition plate 8 in the direction in which the two engagement holes 8d are connected together. Moreover, among the tree guide bars 6a, distal ends of the two guide bars 6a disposed 180 degrees away from each other around the optical axis are disposed at locations where they overlap the two engagement holes 8d of the rotation inhibition plate 8 in the direction of the optical axis.

Next, a description will be given of an exemplary method to assemble the image blur correction apparatus.

First, the positioning holes 2a and the positioning holes 2b of the substrate 2 are inserted into the engagement axes 1d and the positioning axes 1e, respectively, of the base plate 1, and the base plate 1 and the substrate 2 are fixed together by adhesive joining or the like.

Next, inner-diameter hole parts 4a of the coils 4 are inserted into the positioning axes 1e of the base plate 1, and the coils 4 are fixed to the base plate 1 by adhesive joining or the like. It should be noted that the terminals of the coils 4 are mounted on the substrate 2. The terminals of the position detection units 3 are also mounted on the substrate 2, but parts of the position detection units 3 other than the terminals are fixed to the base plate 1 or the substrate 2 by adhesive joining or the like.

Then, the engagement holes 8b of the rotation inhibition plate 8 are inserted into the axis portions of the engagement portions 6b of the holder 6. As a result, the holder 6 is rendered movable with respect to the rotation inhibition plate 8 in the direction in which the two engagement holes 8b are connected together (the direction of an arrow 11y in FIG. 5), and inhibited from moving in the direction of the optical axis by the overhang portions of the engagement portions 6b abutting onto the rotation inhibition plate 8.

Moreover, the holder 6 is inhibited from moving with respect to the rotation inhibition plate 8 in the direction in which the two engagement holes 8d are connected together (the direction of an arrow 11x in FIG. 5). Here, the direction of the arrow 11x corresponds to an exemplary first direction of the present invention, and the direction of the arrow 11y corresponds to an exemplary second direction of the present invention.

Figure 6A:
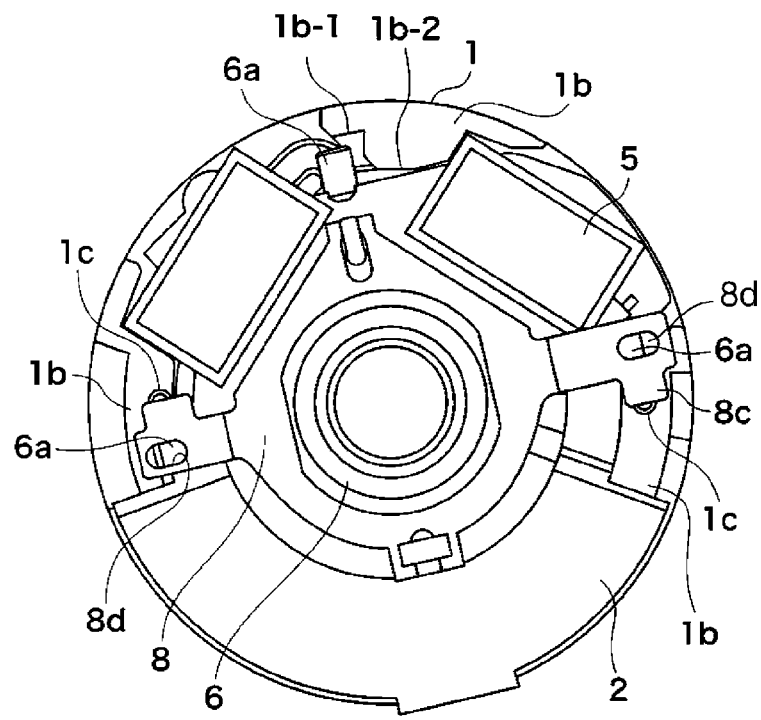
FIGS. 6A and 6B are views useful in explaining how the rotation inhibition plate integrated with the holder is mounted on a base plate.

Then, the flange portions 8c of the rotation inhibition plate 8 are pressed against distal end faces of the engagement axes 1c, which are provided on the engagement portions 1b of the base plate 1 in a protruding manner, as shown in FIG. 6A, and in this state, the holder 6 is rotated about the optical axis.

Figure 6B:
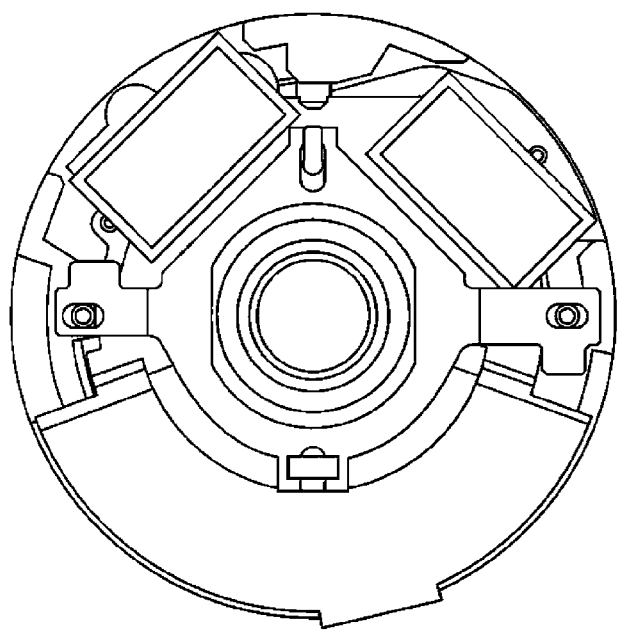

As a result, as shown in FIG. 6B, the distal end portions of the guide bars 6a which are part of the holder 6 are engaged with the guide holes 1b-3 via the openings of the engagement portions 1b of the base plate 1, which are formed in one direction around the optical axis, and the engagement holes 8d of the rotation inhibition plate 8 are engaged with the engagement axes 1c of the engagement portions 1b.

In this state of engagement, the holder 6 is supported by the guide holes 1b-3 of the base plate 1 movably in the direction of the arrow 11x and the direction of the arrow 11y in FIG. 5, and inhibited from moving in the direction of the optical axis by the guide holes 1b-3 of the base plate 1.

Figure 7A:
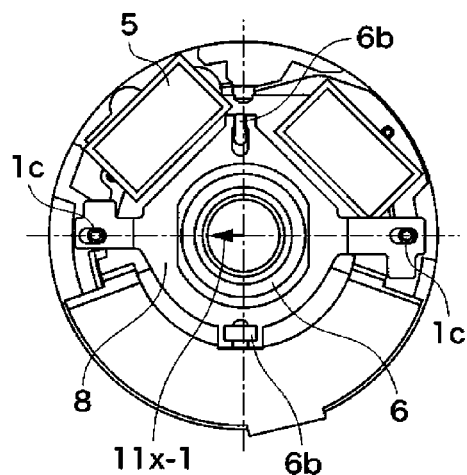
FIGS. 7A to 7D are views useful in explaining the direction in which the holder moves.
Figure 7B:
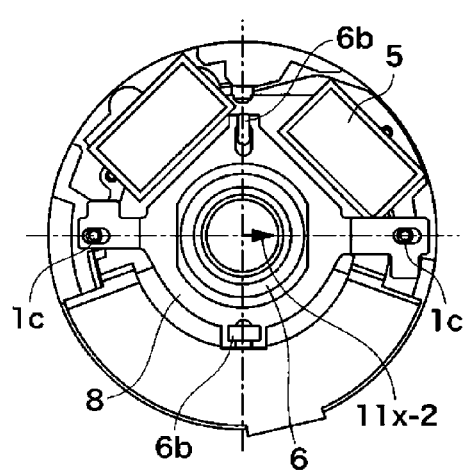

When the holder 6 is to move in the direction of the arrow 11x, the engagement holes 8d of the rotation inhibition plate 8 are engaged with the engagement axes 1c of the base plate 1 movably in the direction of the arrow 11x, and thus the holder 6 moves in the direction of the arrow 11x integrally with the rotation inhibition plate 8 as shown in FIGS. 7A and 7B.

Figure 7C:
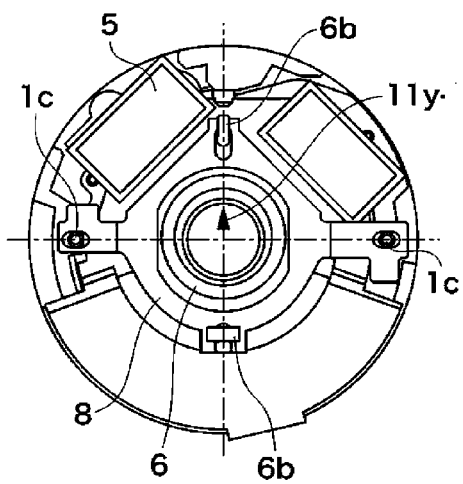
Figure 7D:
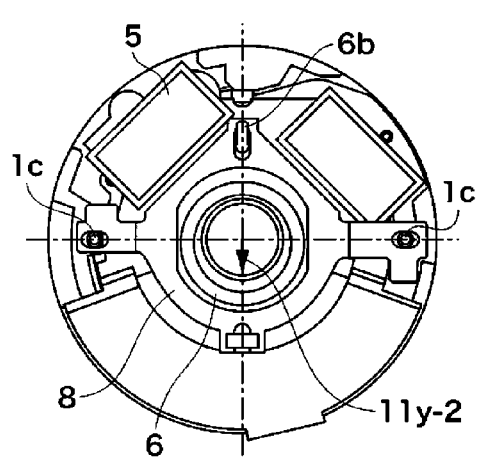

Also, when the holder 6 is to move in the direction of the arrow 11y, the engagement holes 8d of the rotation inhibition plate 8 are inhibited from moving in the direction of the arrow 11y by the engagement axes 1c of the base plate 1, and thus only the holder 6 moves in the direction of the arrow 11y as shown in FIGS. 7C and 7D.

Figure 8A:
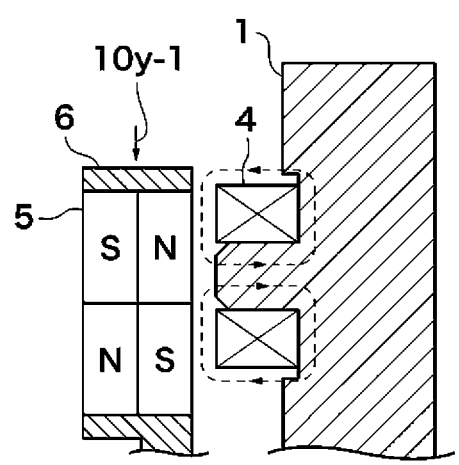
FIGS. 8A and 8B are views useful in explaining how the holder is driven.
Figure 8B:
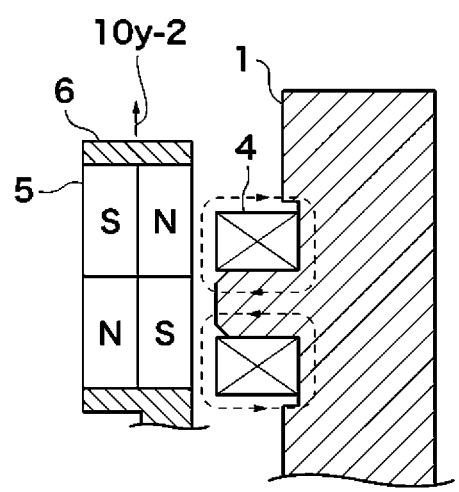

Referring next to FIGS. 8A and 8B, a description will be given of how the holder 6 is driven. In the present embodiment, the holder 6 is driven in directions of arrows 10p and 10y shifted in phase 45 degrees from the directions of the arrows 11x and 11y. It should be noted that the holder 6 is driven in the same way in the directions of the arrows 10p and 10y, and therefore, a description will be given of driving in the direction of the arrow 10y.

Magnetic fluxes of the permanent magnets 5 provided integrally with the holder 6 vertically penetrate the coils 4, and hence when electric current is passed through the coils 4 in a direction indicated in FIG. 8A, the holder 6 is driven in the direction of an arrow 10y-1. On the other hand, when as shown in FIG. 8B, electric current is passed through the coils 4 in a direction opposite to the direction indicated in FIG. 8A, the holder 6 is driven in the direction of an arrow 10y-2.

As described above, in the present embodiment, after the holder 6 is mounted inside the base plate 1, movement of the holder 6 in the direction of the optical axis can be inhibited without screwing separate rollers on the guide bars 6a extended from the holder 6 outwardly in a radial direction. As a result, the number of components can be decreased, and man-hours needed to assemble the image blur correction apparatus can be reduced.

Figure 9:
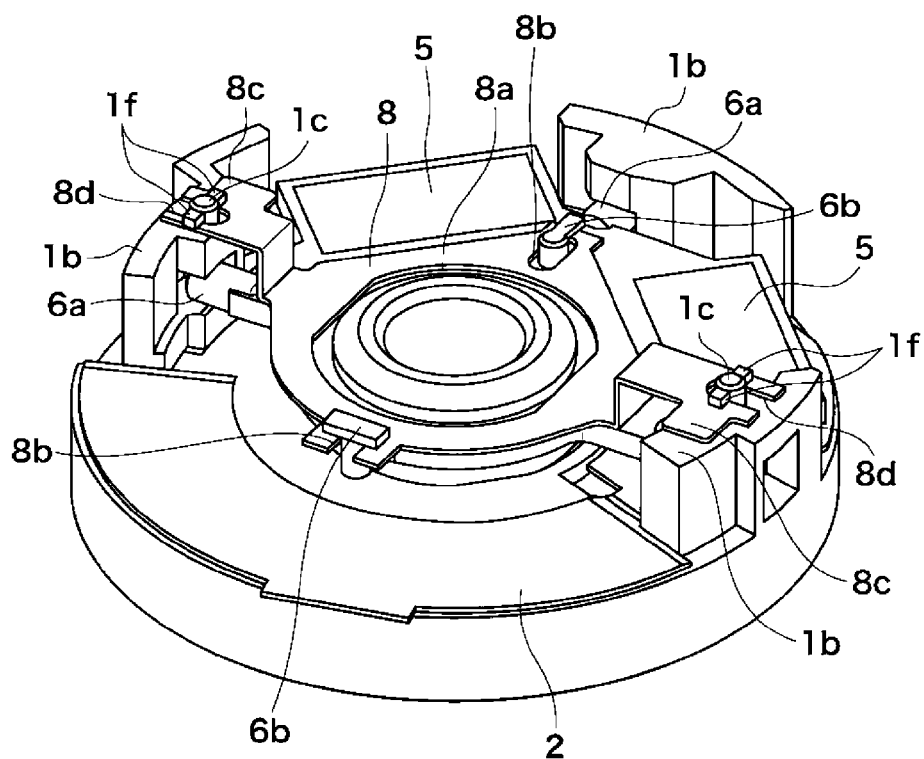
FIG. 9 is a perspective view showing an image blur correction apparatus according to a second embodiment of the present invention.
Figure 10:
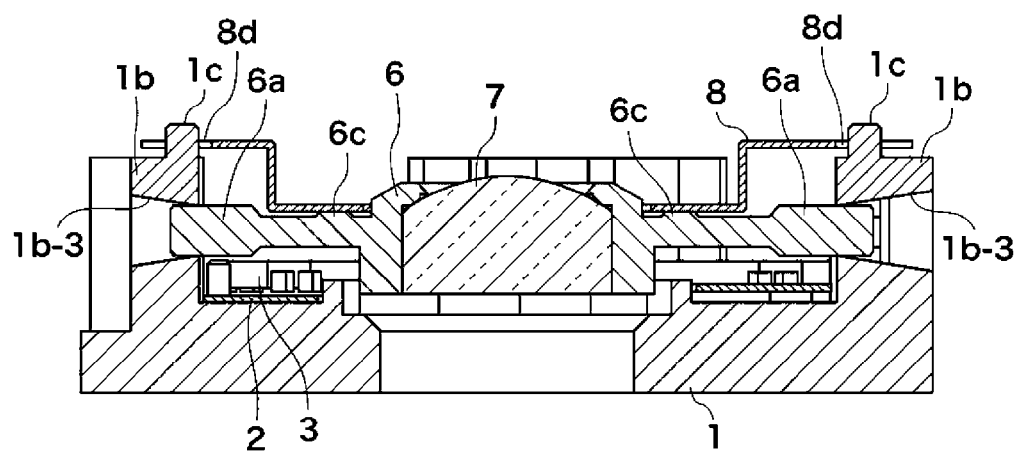
FIG. 10 is a cross-sectional view showing the image blur correction apparatus in FIG. 9.

Referring next to FIGS. 9 and 10, a description will be given of an image blur correction apparatus according to a second embodiment of the present invention. It should be noted that parts overlapping or corresponding to those in the first embodiment described above are designated by the same reference numerals, and description thereof is omitted.

FIG. 9 is a perspective view showing the image blur correction apparatus according to the second embodiment of the present invention, and FIG. 10 is a cross-sectional view showing the image blur correction apparatus in FIG. 9.

As shown in FIG. 9, the image blur correction apparatus according to the present embodiment has overhang portions 1f, which are formed at distal ends of the engagement axes 1c provided in a producing manner on the engagement portions 1b of the base plate 1 and extend in a radial direction from the engagement axes 1c, so as to inhibit the rotation inhibition plate 8 from moving in the direction of the optical axis.

Moreover, as shown in FIG. 10, abutment portions 6c which abut on the rotation inhibition plate 8 in the direction of the optical axis are provided at base ends of the guide bars 6a of the holder 6, and the rotation inhibition plate 8 is sandwiched between the overhang portions 1f of the base plate 1 and the abutment portions 6c of the holder 6.

With this arrangement, the holder 6 is urged in the direction of the optical axis toward the base plate 1 by the rotation inhibition plate 8, and thus there is no play in engagement between the guide bars 6a of the holder 6 and the guide holes 1b-3 of the engagement portions 1b of the base plate 1. As a result, the holder 6 can be prevented from inclining with respect to the optical axis, and optical performance can be improved. Other arrangements and effects are the same as those in the first embodiment described above.

Figure 11:
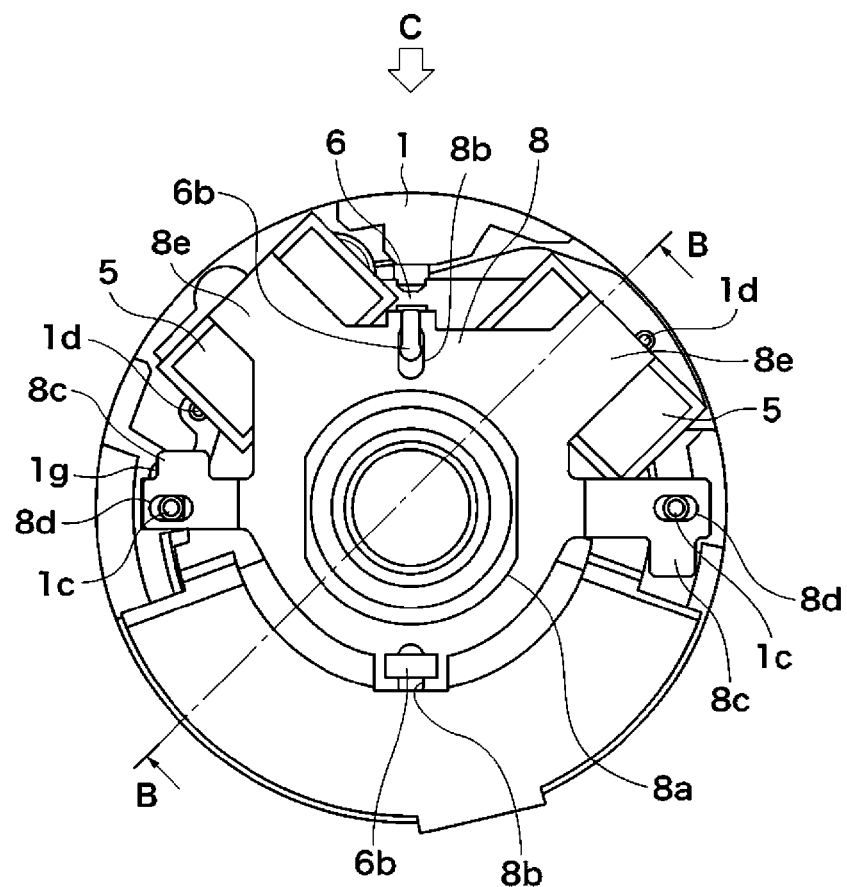
FIG. 11 is a frontal view showing an image blur correction apparatus according to a third embodiment of the present invention as seen from the direction of an optical axis.
Figure 12:
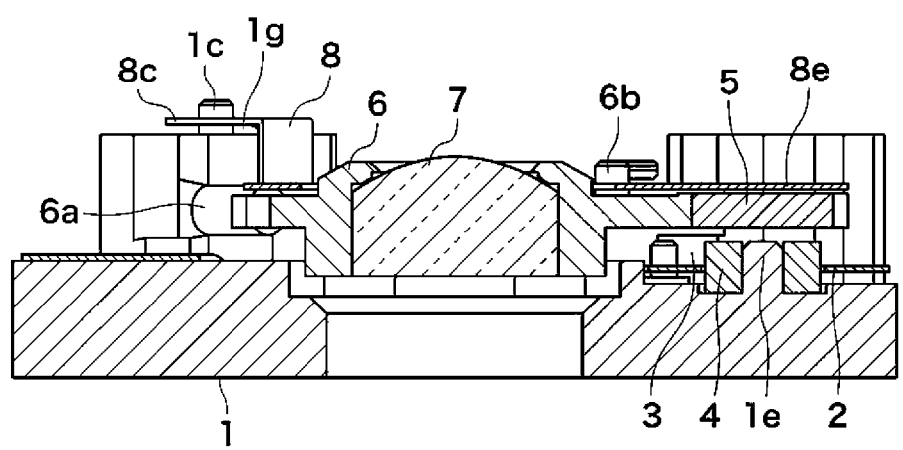
FIG. 12 is a cross-sectional view taken along line B-B in FIG. 11.
Figure 13:
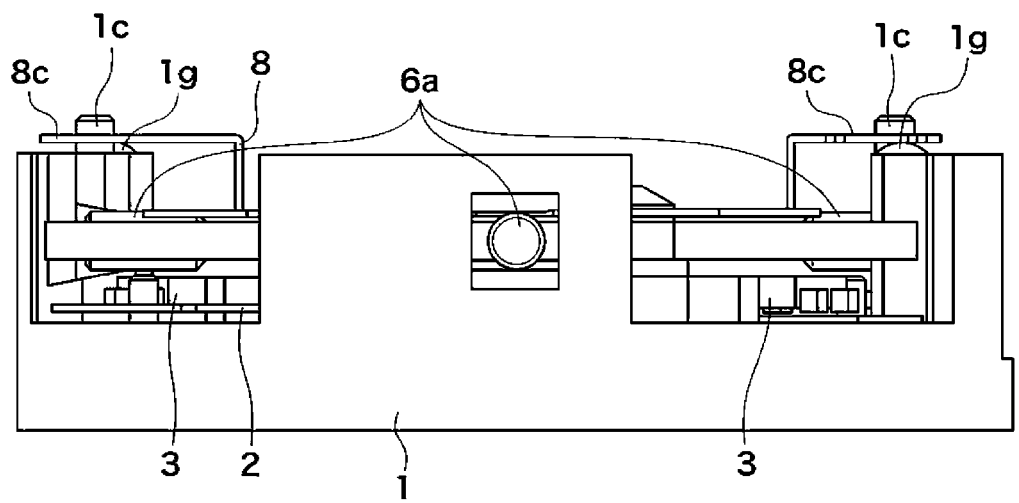
FIG. 13 is a cross-sectional view taken from the direction of an arrow C in FIG. 11.
Figure 14:
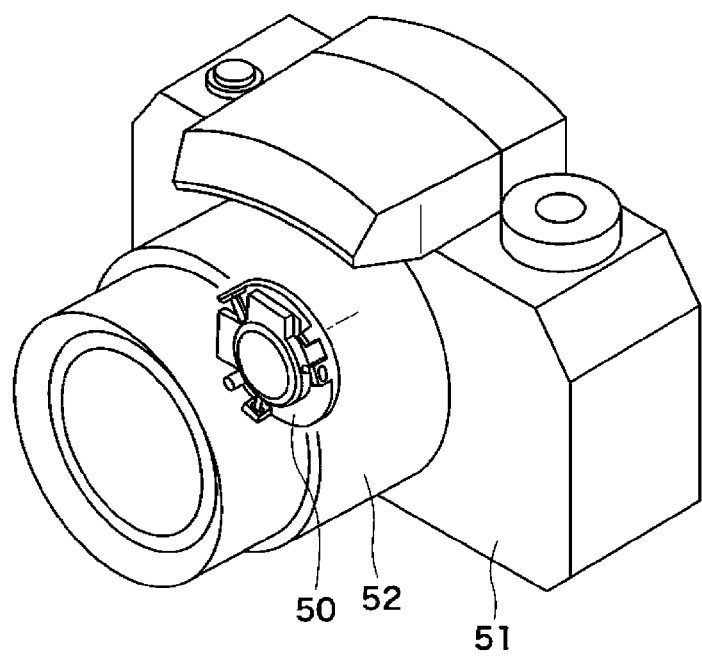
FIG. 14 is a perspective view showing a conventional image blur correction apparatus mounted on a lens barrel of a digital camera.

Referring next to FIGS. 11 to 13, a description will be given of an image blur correction apparatus according to a third embodiment of the present invention. It should be noted that parts overlapping or corresponding to those in the first embodiment described above are designated by the same reference numerals, and description thereof is omitted.

FIG. 11 is a view showing the image blur correction apparatus according to the third embodiment of the present invention as seen from the direction of the optical axis, FIG. 12 is a cross-sectional view taken along line B-B in FIG. 11, and FIG. 13 is a view taken from the direction of an arrow C in FIG. 11.

The image blur correction apparatus according to the present embodiment has the rotation inhibition plate 8 made of a soft magnetic material, and as shown in FIGS. 11 to 13, the rotation inhibition plate 8 is provided with overhang portions 8e having surfaces opposed to the permanent magnets 5, which are provided on the holder 6, in the direction of the optical axis.

The base plate 1 is provided with abutment portions 1g that abut on the flange portions 8c of the rotation inhibition plate 8 in the direction of the optical axis to inhibit movement of the rotation inhibition plate 8 toward the holder 8.

Because the overhang portions 8e of the rotation inhibition plate 8 and the permanent magnets 5, which are provided on the holder 6, are disposed in opposed relation to each other in the direction of the optical axis, a magnetic attractive force is generated between the rotation inhibition plate 8 and the permanent magnets 5. This magnetic attractive force magnetically attracts the rotation inhibition plate 8 toward the holder 6 in the direction of the optical axis. However, because movement of the rotation inhibition plate 8 toward the holder 6 is inhibited by the abutment portions 1g of the base plate 1, the holder 6 is magnetically attracted toward the rotation inhibition plate 8.

This eliminates the play in engagement between the guide bars 6a of the holder 6 and the guide holes 1b-3 of the engagement portions 1b of the base plate 1, and as a result, the holder 6 can be prevented from inclining with respect to the optical axis, and optical performance can be improved. Other arrangements and effects are the same as those in the first embodiment described above.

Although in the embodiments described above, the image blur correction apparatus is mounted on a lens barrel of a digital camera to act as image blur correction unit that corrects for a blur of an optical image formed by an image pickup optical system, the present invention may also be applied to any other image blur correction apparatus mounted on a lens barrel of an image pickup apparatus such as a digital video camera, a monitoring camera, or a Web camera.

Moreover, the image blur correction apparatus according to the present invention may be applied to aberration correction in a polarizing device or an optical axis rotation device included in optical equipment such as binoculars, a mobile terminal such as a cellular phone, or a stepper.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-160631 filed Jul. 15, 2010, which is hereby incorporated by reference herein in its entirety.

What is claimed is:

1. An image blur correction apparatus comprising:
a lens holder configured to hold a lens;
a drive unit configured to move said lens holder;
a base member configured to support said lens holder in such a manner that said lens holder is movable in a direction perpendicular to an optical axis, wherein said lens holder is disposed on a subject side of said base member, and wherein said base member comprises an engagement portion having an opening disposed in a direction around the optical axis, and part of said lens holder is engaged with the engagement portion to inhibit movement of said lens holder in the direction of the optical axis; and
a rotation inhibition member configured to inhibit movement of said lens holder in the direction around the optical axis,
wherein said rotation inhabitation member has a first connection part which connects with said base member and a second connection part which connects with said lens holder,
said base member has a first engagement part which engages with the first connection part,
said lens holder has a second engagement part which engages with the second connection part,
the first connection part and the first engagement part are engaged with each other so that said rotation inhabitation member is movable in a first direction perpendicular to the optical axis in combination with said lens holder with respect to said base member, and
the second connection part and the second engagement part are engaged with each other so that said rotation inhabitation member is movable in a second direction perpendicular to the optical axis with respect to said lens holder.

2. The image blur correction apparatus according to claim 1,
wherein said drive unit comprises a coil provided on the subject side of said base member, and a permanent magnet provided on said lens holder in such a manner as to face the coil in the direction of the optical axis.

3. The image blur correction apparatus according to claim 2,
wherein said lens holder comprises an overhang portion having a surface facing the permanent magnet in the direction of the optical axis, and
wherein said base member abuts on said rotation inhibition member with respect to the direction of the optical axis, and comprises an abutment portion that inhibits said rotation inhibition member from moving toward said lens holder.

4. The image blur correction apparatus according to claim 2,
wherein said rotation inhibition member is made of a soft magnetic material, and
wherein said lens holder is magnetically attracted toward said rotation inhibition member in the direction of the optical axis.

5. The image blur correction apparatus according to claim 1,
wherein said rotation inhibition member is made of a spring material, and supported on said base member while being inhibited from moving in the direction of the optical axis, and
wherein said lens holder is supported on said base member while being urged toward said base member by said rotation inhibition member in the direction of the optical axis.

6. An image pickup apparatus having an image blur correction apparatus according to claim 1.

7. An image blur correction apparatus comprising:
a lens holder configured to hold a lens;
a drive unit configured to move said lens holder;
a base member configured to support said lens holder in such a manner that said lens holder is movable in a direction perpendicular to an optical axis, wherein said lens holder is disposed on a subject side of said base member, and wherein said base member comprises an engagement portion having an opening disposed in a direction around the optical axis, and part of said lens holder is engaged with the engagement portion to inhibit movement of said lens holder in the direction of the optical axis; and
a rotation inhibition member configured to be disposed on an opposed side of said base member across said lens holder,
wherein said rotation inhabitation member has a first connection part which connects with said base member and a second connection part which connects with said lens holder,
said base member has a first engagement part which engages with the first connection part, said lens holder has a second engagement part which engages with the second connection part, the first connection part and the first engagement part are engaged with each other so that said rotation inhabitation member is movable in a first direction perpendicular to the optical axis in combination with said lens holder with respect to said base member, and the second connection part and the second engagement part are engaged with each other so that said rotation inhabitation member is movable in a second direction perpendicular to the optical axis with respect to said lens holder.

8. The image blur correction apparatus according to claim 7, wherein said drive unit comprises a coil provided on the subject side of said base member, and a permanent magnet provided on said lens holder in such a manner as to face the coil in the direction of the optical axis.

9. The image blur correction apparatus according to claim 8, wherein said lens holder comprises an overhang portion having a surface facing the permanent magnet in the direction of the optical axis, and wherein said base member abuts on said rotation inhibition member with respect to the direction of the optical axis, and comprises an abutment portion that inhibits said rotation inhibition member from moving toward said lens holder.

10. The image blur correction apparatus according to claim 8, wherein said rotation inhibition member is made of a soft magnetic material, and wherein said lens holder is magnetically attracted toward said rotation inhibition member in the direction of the optical axis.

11. The image blur correction apparatus according to claim 7, wherein said rotation inhibition member is made of a spring material, and supported on said base member while being inhibited from moving in the direction of the optical axis, and wherein said lens holder is supported on said base member while being urged toward said base member by said rotation inhibition member in the direction of the optical axis.

12. An image pickup apparatus having an image blur correction apparatus according to claim 7.

13. The image blur correction apparatus according to claim 1, wherein the first connection part comprises a first elongated hole which opens being long in the first direction, the first engagement part comprises a first convex part which is provided in a protruding manner in the direction of optical axis, and the first convex part is inserted into the first elongated hole.

14. The image blur correction apparatus according to claim 13, wherein a width of the first elongated hole in the second direction is the same as a width of the first convex part in the second direction.

15. The image blur correction apparatus according to claim 1, wherein the second connection part comprises a second elongated hole which opens being long in the second direction, the second engagement part comprises a second convex part which is provided in a protruding manner in the direction of optical axis, and the second convex part is inserted into the second elongated hole.

16. The image blur correction apparatus according to claim 15, wherein a width of the second elongated hole in the first direction is the same as a width of the second convex part in the first direction.

17. The image blur correction apparatus according to claim 7, wherein the first connection part comprises a first elongated hole which opens being long in the first direction, the first engagement part comprises a first convex part which is provided in a protruding manner in the direction of optical axis, and the first convex part is inserted into the first elongated hole.

18. The image blur correction apparatus according to claim 17, wherein a width of the first elongated hole in the second direction is the same as a width of the first convex part in the second direction.

19. The image blur correction apparatus according to claim 7, wherein the second connection part comprises a second elongated hole which opens being long in the second direction, the second engagement part comprises a second convex part which is provided in a protruding manner in the direction of optical axis, and the second convex part is inserted into the second elongated hole.

20. The image blur correction apparatus according to claim 19, wherein a width of the second elongated hole in the first direction is the same as a width of the second convex part in the first direction.

* * * * *